United States Patent [19]

Van Wilson

[11] 3,968,575

[45] July 13, 1976

[54] TEACHING DEVICE

[76] Inventor: Marlin Van Wilson, Rte. 1, Barboursville, Va. 22923

[22] Filed: Apr. 2, 1975

[21] Appl. No.: 564,292

[52] U.S. Cl. .................................. 35/9 A; 35/9 E
[51] Int. Cl.² .......................................... G09B 5/06
[58] Field of Search ............................. 35/9 A, 9 E

[56] References Cited
UNITED STATES PATENTS

| | | | |
|---|---|---|---|
| 3,162,959 | 12/1964 | Woolman | 35/9 E |
| 3,174,231 | 3/1965 | Schure | 35/9 E X |
| 3,425,148 | 2/1969 | Reese | 35/9 E UX |
| 3,628,255 | 12/1971 | Golden | 35/9 E |
| 3,680,224 | 8/1972 | Hall | 35/9 E |
| 3,739,069 | 6/1973 | Sandmeier | 35/9 E |
| R23,030 | 8/1948 | Holt | 35/9 E |

Primary Examiner—Wm. H. Grieb
Attorney, Agent, or Firm—Mason, Fenwick & Lawrence

[57] ABSTRACT

An audio visual device for teaching students a variety of subjects and motor skills, said device including a work surface, a projector, an audio device and a control package; said projector may be a movie, slide or film strip and projects onto the work surface a visual image with which the student may interact; said audio device, such as a tape recorder, provides audible instruction in synchronization with the visual image provided by the projector; said control package regulates the sequencing of the projector and the audio device in response to the student's activating a look-up button for additional information and pushing an advance button if no additional information is required and color filtering and spatial filter masking the visual image control the display of additional information to the student.

20 Claims, 10 Drawing Figures

TEACHING DEVICE

This invention relates to audio visual devices for teaching a variety of subjects and motor skills to students and is more specifically directed to a unique and effective teaching device wherein a visual and an audio device are controlled by a control package to provide an interacting teaching device which is capable of responding to the student's capability to learn and remember the program material being taught.

Most audio visual devices marketed today provide the student with a visual image and an audible statement and then ask a question. The student's response is limited to selecting an answer button in response to multiple choices available for the question asked. The existing devices are passive because there is no interaction between the student and the visual image. An individual is unable, with the existing devices, to relate directly with the visual image through providing a tactile response, and most audio visual devices do not create a permanent record of the student's responses which is coordinated with the presentation by the device.

Current audio visual devices communicate in the fashion of a lecturer giving a lecture to a large class wherein the monitors test the students on the basis of the material presented in the lectures. The same lecture is repeated for the students not scoring sufficiently high on the test to advance to the next lecture. Previous audio visual devices have not effectively interacted with the student's capability to learn and absorb the material being presented, and have not provided a learning rate capable of adapting automatically to the individual student's needs. Of the many audio visual devices on the market today, none provides an interaction between the audio, visual and tactile senses adaptable to the individual student's needs to provide a maximum learning rate for students of widely varying capabilities.

Therefore, it is the object of the present invention to provide a new and improved audio visual training device.

Another object of the present invention is to provide an audio visual device in which the visual image is also a working medium interacting with tactile sense of the student.

A still further object of the present invention is to provide an audio visual device in which a color network of filters flashes clues or presents new information for a brief period of sufficiently short duration to prevent the student from copying the clue or information.

A still further object of the present invention is to provide an audio visual device utilizing shutters for exposing only partial images of the visual display to speed the learning rate of the students.

An additional object of the present invention is to provide an audio visual training device including electronic scoring wherein the student who needs additional information or clues strikes a look-up button and the look-ups are counted to regulate the rate of providing additional information.

Obtainment of the objects of this invention is enabled through the provision of a workstand containing a projector and accessory optics for projecting a visual image onto a work surface of the workstand convenient for the student to be able to write within the area of projection on an answer or blank sheet of paper. An audio device in the workstand is controlled in synchronization with the projector by electronic circuitry in an electronic control package. Filters and shutter devices are positioned by the control package within the projector beam responsive to a student pressing a look-up button or advance button to provide an adaptive audio visual system capable of responding to the individual's needs.

A better understanding of the manner in which the preferred embodiment of this invention achieves the objects of the invention will be enabled when the following written description is considered in conjunction with the appended drawings in which:

Attention is initially invited to FIGS. 1 through 5 of the drawings which illustrate the optical and mechanical aspects of the preferred embodiment 20 of the invention. The preferred embodiment 20 includes a housing 22 having a hinged work table 25 positioned above a slide projector 24 (FIG. 2) mounted in a compartment in the housing to project optical images past a plurality of photocells 39 provided about an aperture 62 in a partition 60 of the housing. The optical image is projected through a color filter assembly 37 mounted adjacent the partition 60 to a lower reflecting mirror 26 from which it is reflected to and through a spacial filter 38 mounted in the upper portion of the housing. The image passing through the spacial filter assembly 38 is reflected by a second or upper mirror 28 downwardly to the work table 25. A cassette tape recorder 30 such as an Elco Optisonics Model 2 of the Elco Corp. (FIG. 3) is also mounted in the housing along with an electronic control package 32. Control buttons including a look-up button 34 and an advance button 36 are mounted on a panel 72 facing the work table so as to be easily accessible by the person using the device.

Figures 1, 2:
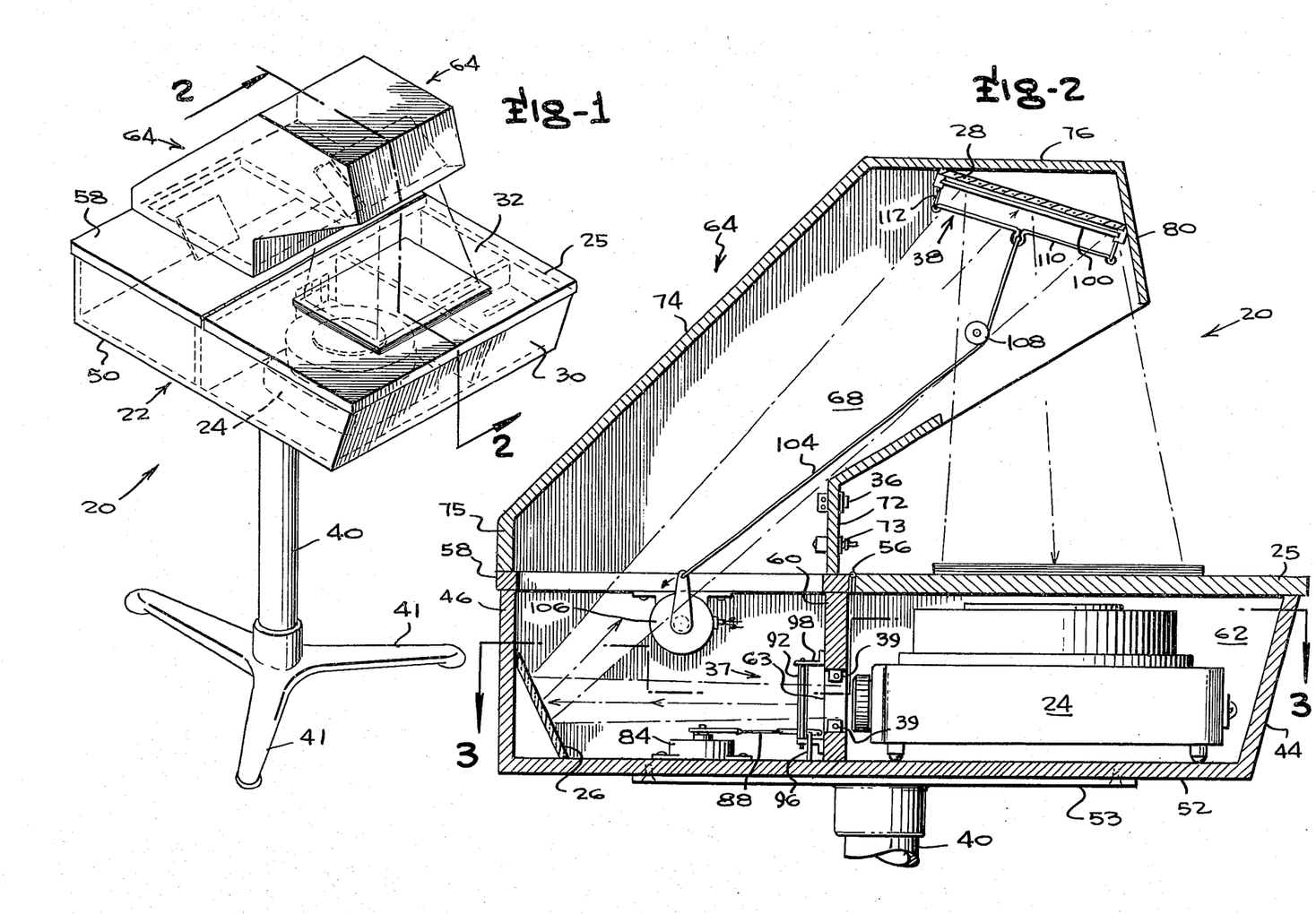
FIG. 1 is a perspective view of the preferred embodiment.
FIG. 2 is a sectional side view of the preferred embodiment taken along line 2—2 in FIG. 1.

The work table 25 is supported, at a height convenient for the student using the system, by a pedestal 40 having tripod feet 41 which provide a rigid and stable support for the housing 22 and work table 25. Housing 22 is in the form of a closed box having a rearwardly sloping front wall 44 for the convenience of a student sitting adjacent this wall, a rear wall 46, side walls 48 and 50, and a bottom 52 connected to the front, back and side walls and attached to a flange 53 at the top of the pedestal 40 as best illustrated in FIG. 2. The work table 25 is pivoted on hinges 56 to a rear top cover 58 which permits access to the projector 24 and the recorder 30 to enable changing of the film and tape cassettes as required by the program of instruction.

Partitions 60, 61 and 62 divide the housing 22 into compartments to contain the projector 24, recorder 30 and control package 32 and the transverse partition 60 has a central aperture 62 for permitting passage of the beam of the projector 24 as was noted previously. A projector hood 64 for the projected beam is attached to and extends upwardly from the rear cover 58 and includes hood side walls 66 and 68, the front panel 72 for mounting the look-up button 34, the advance button 36 and an earphone jack 73; hood 64 also includes rear cover hood walls 74 and 75, a top wall 76 and a front shield wall 80 which in combination with top cover 76 provides support for the upper mirror 28 and the spatial filter assembly 38. Upper mirror 28 in combination with the lower portion of the stand provides an optical path for projecting the image from the projector 24 onto the work table 25.

Figure 3:
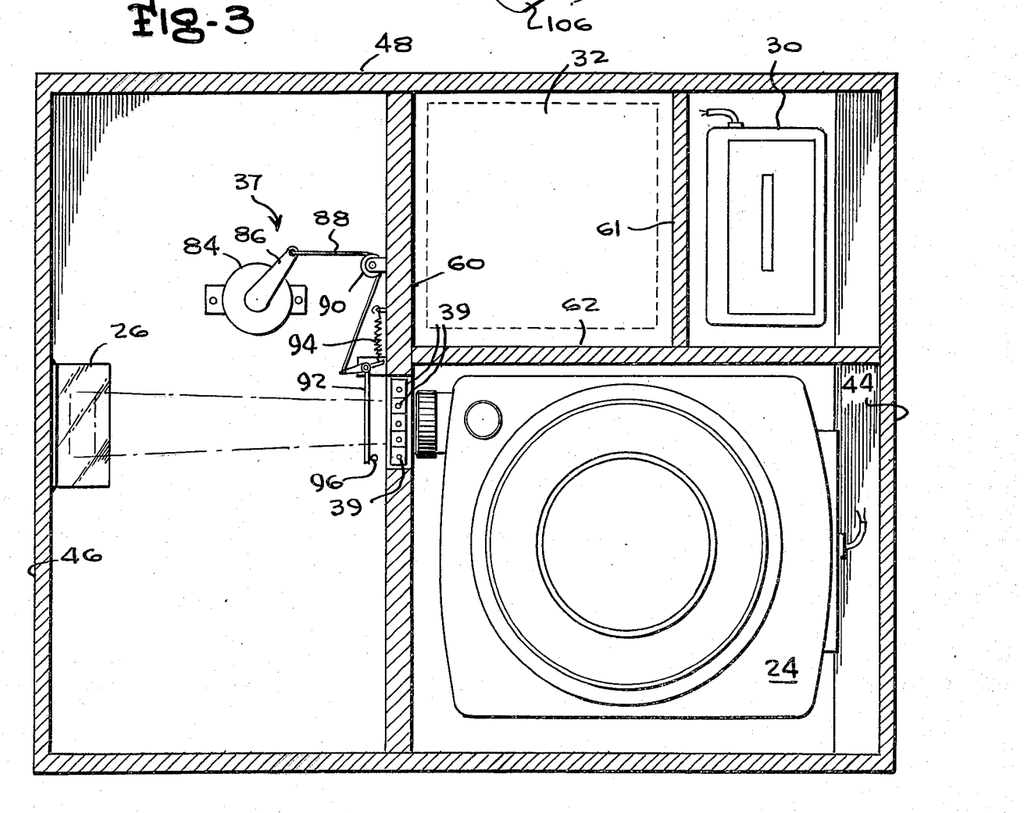
FIG. 3 is a sectional top view of the preferred embodiment taken along line 3—3 in FIG. 2.
Figure 4:
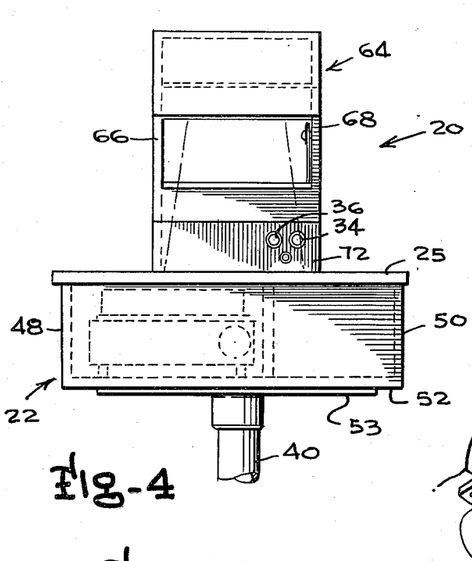
FIG. 4 is a reduced front elevational view of the preferred embodiment shown in FIG. 1.
Figure 5:
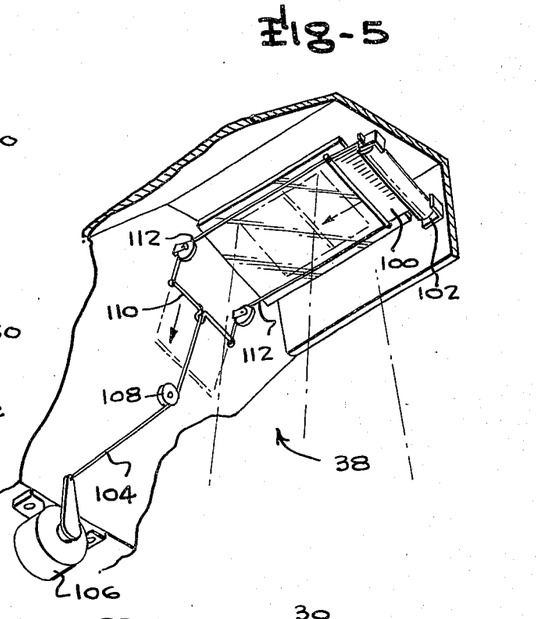
FIG. 5 is a fragmentary perspective view of the shutter mechanism shown in FIG. 2.

The color filter assembly 37 as shown in FIGS. 2 and 3 includes a rotary solenoid 84 which rotates arm 86 to retract cable 88 over pulley 90 thereby causing color filter 92 to pivot out of the projected beam from the projector 24. When the solenoid is deactivated, spring 94 causes the color filter 92 to return to its position adjacent stop pin 96. The color filter pivots on support brackets 96 attached to transverse partition 60. The spatial filter assembly 38 is similar to the color filter except the spatial filter 100 as shown in FIGS. 2 and 5 is made of opaque flexible material wound on a roll 102 similar to a curtain shade and is unwound from the roll by cable 104 connected to a rotary solenoid 106, passing over pulley 108 and connected to yoke 110 having cables 112 apropriately connected to the spatial filter 100.

The photocells 39 are positioned within the upper and lower edges of the projected beam from the projector 24 as shown in FIGS. 2 and 3 and function as described hereafter.

Lesson materials to be taught to the student using this invention are contained on the film image from the projector and on the audio output from the tape recorder. The edges of the film image are coded with transparent and black areas called dots to activate the photocells 39 and control the sequence of lesson materials, whereby a studen's response will result in the provision of a proper and desirable sequence of subsequent lesson materials.

Figure 6:
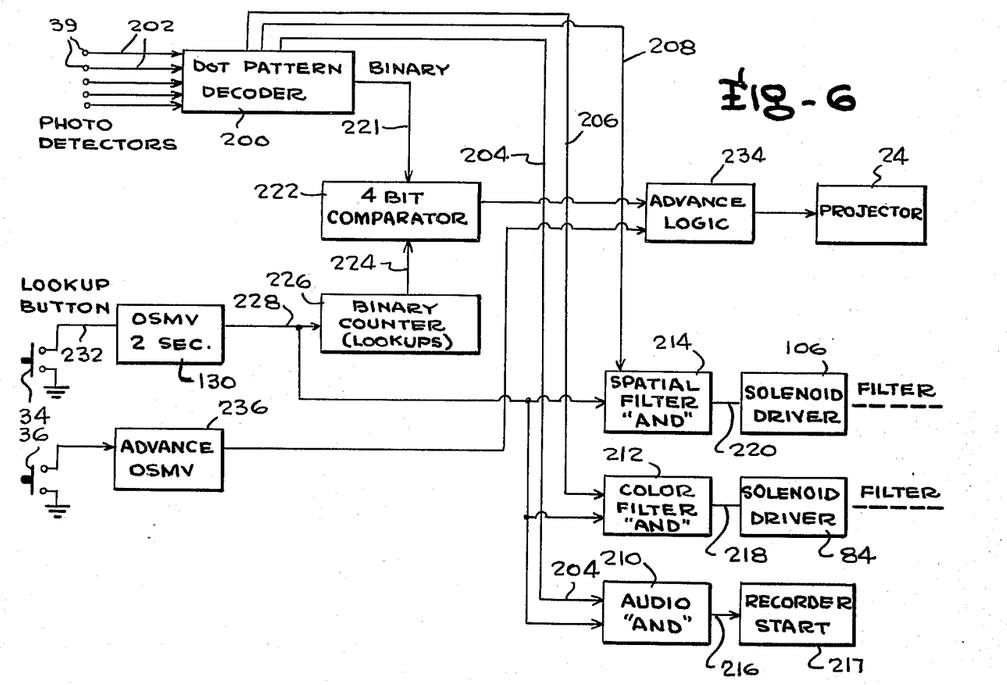
FIG. 6 is a diagrammatic block diagram of the preferred embodiment.

The control circuitry for the invention will now be discussed with initial reference being made to a dot pattern decoder 200 which responds to the outputs 202 from the photo detectors 39, triggered by the light and dark dot arrangement (always invisible to the student) on the upper and lower edges of the film to control the sequencing of the color filter, the spatial filter and the audio channel when the student presses the look-up button 34. The proper filter or audio channel will be activated by the decoder 200 to assist the student in performing the assignment contained on that particular lesson frame. This teaching function is shown by the decoded dot pattern outputs 204, 206 and 208 respectively connected to one of the inputs of a recorder control AND gate 210; a color filter control AND gate 212 and a spatial filter control AND gate 214.

The recorder control AND gate 210 has an output 216 connected to a recorder start switch 217 of the recorder 30 while the color filter AND gate 212 has an output 218 connected to the solenoid 84 for actuating the filter 92. Similarly, the spatial filter control AND gate 214 has an output 220 connected to the spatial filter solenoid 106.

The dot pattern decoder 200 shown in FIG. 6 has another output 221 which inputs information to a 4 bit comparator 222 connected to the output 224 of a look-up binary counter 226 totalized from the look-up button 34 to determine if the student reaction is of high performance or of a low receptiveness to the lesson contained on the particular film frame being studied. The input to binary counter 226 consists of the output 228 of a look-up one shot multivibrator 130 connected to look-up button 34 by conductor 232. This comparison of the difficulty rating of the film via dot patterns versus the sequence of look-up button activations by the student on that particular film determines in advance logic circuit 234 for projector 24 which controls film feed to move the film either ahead several frames to new material or only one or two frames or to review or remedial material.

The decision to advance in the "advance logic" circuit 234 will occur when the student begins a new lesson set after completing the assigned work by pressing the advance button 36 and triggering an advance one shot multivibrator (advance OSMV) 236.

A more detailed description of these general functions is included in the following paragraphs.

The photo cells 39 as shown in FIG. 2 are positioned on the upstream side of the spatial filter assembly 38 and color filter assembly 37. Although this location is not in the image plane which is at the student's writing surface 54, the location is close enough to permit discrimination by the photocells 39 between black and transparent areas on the edge of the film.

The code dots are placed photographically on the edges of the film transparencies therefore most of the film area may contain the lesson material. The number of code dots is optional; however, the preferred embodiment has ten corresponding with the five upper and five lower photocells.

Figures 9, 10:
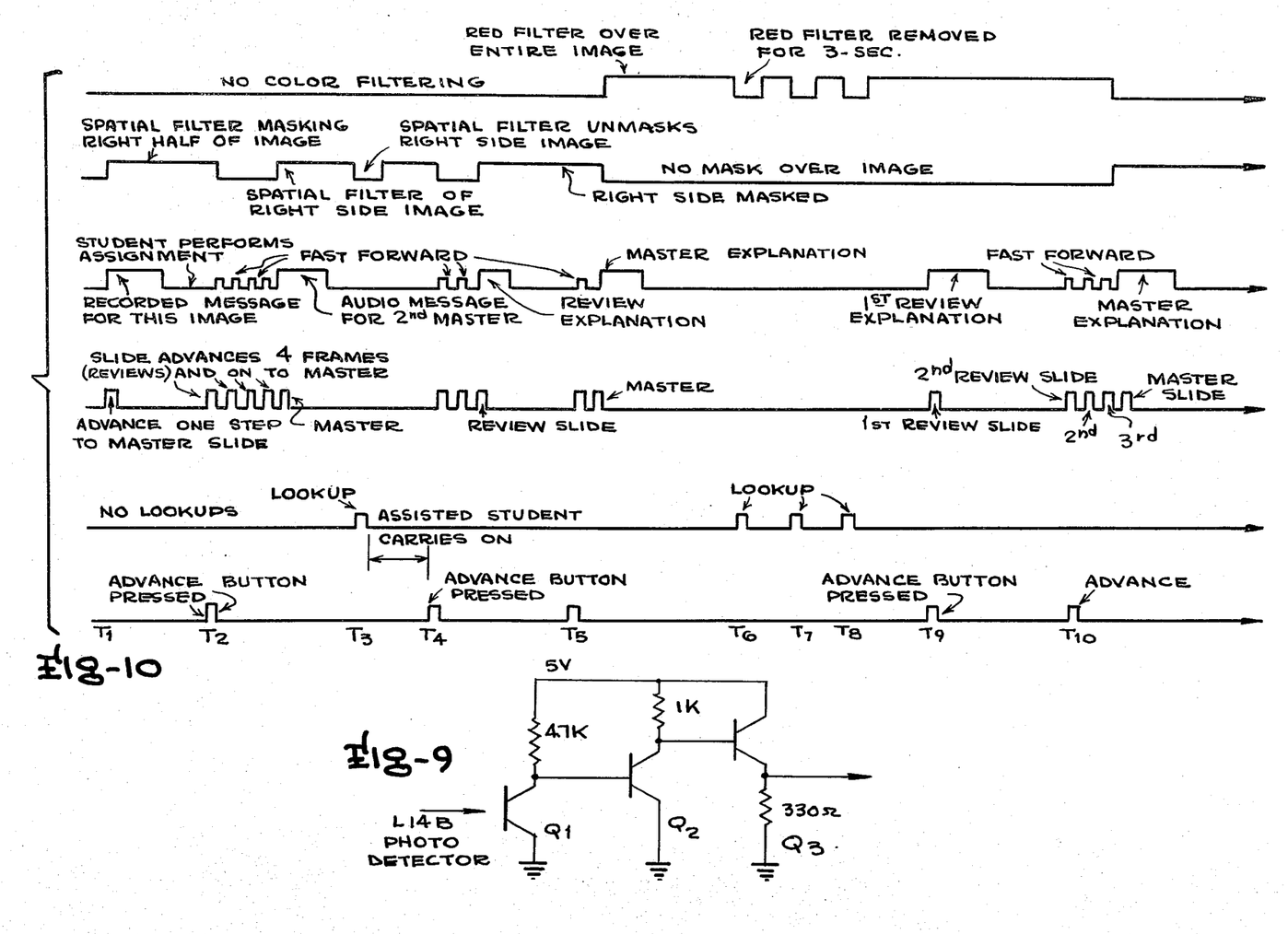
FIG. 9 is a schematic diagram for each photo cell and its amplifier.
FIG. 10 is a timing chart showing the sequencing of the various elements in the preferred embodiment.

The code dot to electronic interface is shown in FIG. 9. The photo transistor Q1 of one of the photocells 39 drives a common emitter stage Q2 followed by an emitter follower Q3 whose output is capable of driving the logic gates in the remainder of the system. The presence of a transparent code dot will cause the photo transistor Q1 to conduct which causes the base voltage of Q2 to decrease. This reduces the current in Q2, allowing its collector to rise and this rise is conducted to the emitter of Q3 by the transistor action of Q3. This high emitter voltage becomes the output denoting the presence of a transparent code dot. The reverse action occurs when a black dot is sensed.

Figure 7:
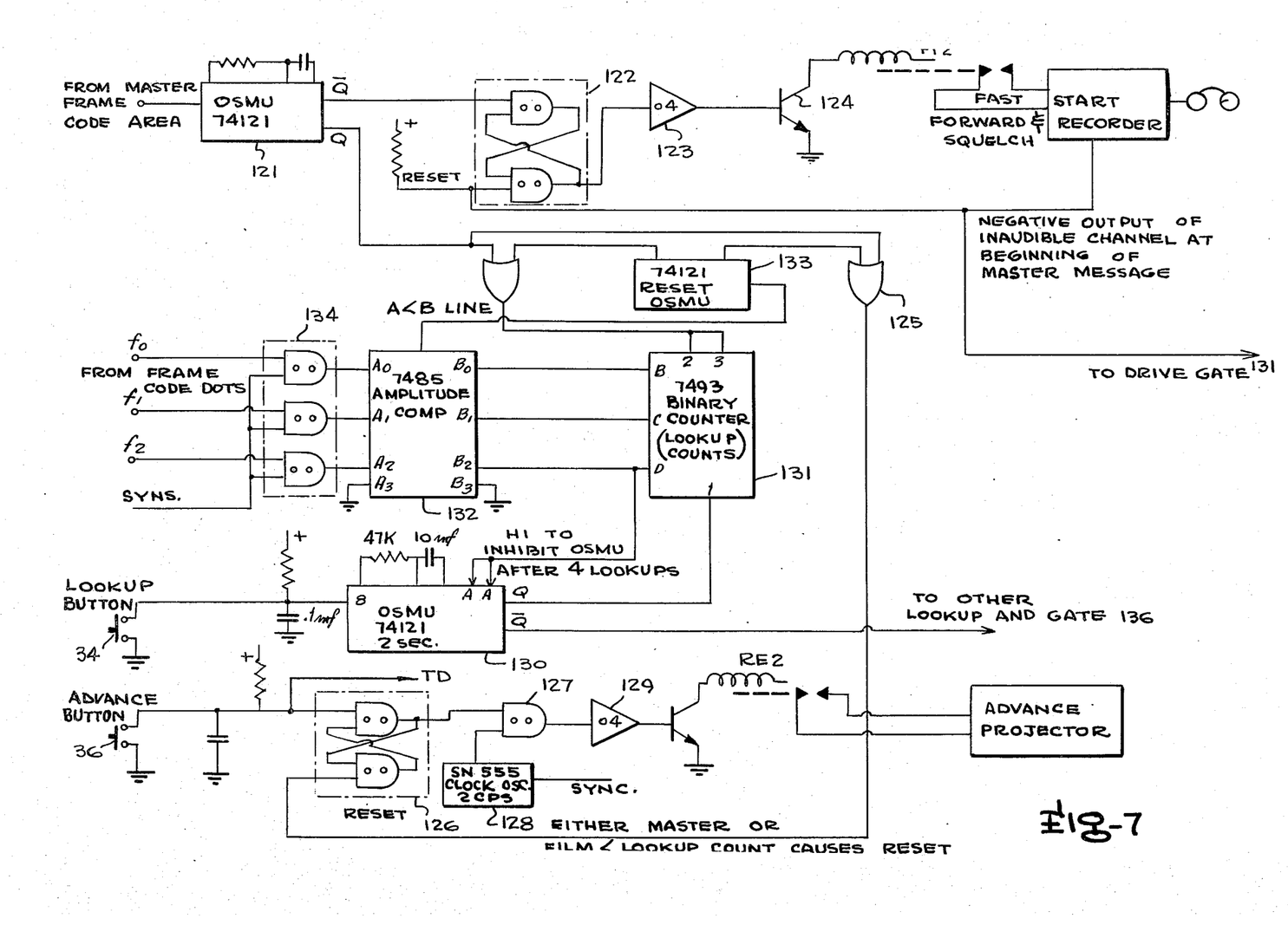
FIG. 7 and 8 are schematic diagrams of the control package and other components in the preferred embodiment.

The output from the dot interface amplifiers perform a number of functions. One of the code areas functions as an identification of a master slide. Master slides are always projected because they contain new material necessary for the student's curriculum. A perfect student, not requiring any lookups would advance directly from master slide to master slide while the audio recorder would advance in a fast forward mode skipping over explanations and enlargements on the previous master message to the beginning of the next master audio message. This function is shown in FIG. 7 where the output of the master frame code area connects with a one shot multivibrator (OSMV) 121 one output of which is used to set a flip flop 122 (formed of two AND gates) the output of which drives an intermediate amplifier 123 which drives a transistor 124 which closes a relay RE-1 to cause the tape recorder to move into a fast foreward mode. When a tape recorder inaudible channel detects the beginning of a master message beep it supplies an output to reset flip flop 122 which will turn off transistor 124 and allow the recorder to slow to a normal speed and deliver a new master message.

The output from OSMV 121 which denotes the presence of a master slide also feeds through OR gate 125 to flip flop 126 and resets it. The flip flop 126 has been set by the advance button 36 and causes a high output to the AND gate 127 which gate is also being fed a low frequency (approximately 2 cycle per second) square wave from the free running square wave oscillator 128. When both inputs of AND gate 127 are high it provides a low output to amplifier inverter 129 which drives a relay RE-2 to cause the film projector to advance one film slide. When the output of oscillator 128 falls to zero, the action of gate 127 is one input high and one low and the output goes high. This drives amplifier 129 to remove current from the relay RE-2. When oscillator 128 once again goes high, the relay pulls in and advances the film one step. This action and film stepping will continue indefinitely until flip flop 126 is reset by the output of OR gate 125. When flip flop 126 is reset its output goes low and at that time neither a positive or negative output of oscillator 128 will cause the output of gate 127 to go low and therefore the film does not advance further.

A low output from gate 125 will stop the film advancement and this can occur for either of two reasons. One reason is when a master slide is detected entering the view and causing OSMV 121 to trigger and supply one of the OR inputs to gate 125. The other reason is when the film advance is caused to stop by the lookup counting and film comparison circuitry discussed hereafter.

Each slide, after the master slide, has a group of 3 dots set aside as a difficulty number. These would usually be in descending order, that is the one following the master slide would have the highest number. As an example, the first frame after the master may have a binary 5 encoded on its 3 frame dots which would be white black white, the second frame would be binary 4, the third frame would be binary 3, the fourth frame would be binary 2 and the fifth frame would be a new master. This example provides 4 subordinate frames for each master frame.

Consider the case where the student is working on the first master frame and has required help by pressing the look-up button 34, four times. Each operation of the look-up button has triggered OSMV 130 and caused 4 individual pulses to pass into the look-up counter 131. The count in the counter then becomes binary 4. This binary 4 count is fed into the B inputs of binary amplitude comparator 132. This binary comparator apparatus is a well known device such as the TI7485 which compares the magnitude of the binary number at its A inputs with that of its B inputs. An output is available that is positive only when the magnitude of A is less than the magnitude of B. This output is used to trigger the one shot multivibrator 133.

The value of each code area pattern is brought into the amplitude comparator 132 at its A inputs from the dot interfaces and the AND gates 134. The look-up button 34 having been pushed and the film advancing brings first a code area patern with magnitude of binary 5 (first slide after master). This does not cause an output from the A B line of comparator 132 since the A is 5 and B is 4. The sequence repeats until the 3rd slide, at which time A becomes 3 and B remains 4. This causes a positive output to trigger OSMV 133 which generates a pulse to pass through OR gate 125 and resets flip flop 126 and stops further indexing of the slide projector. The third slide is a review of the first master slide and was selected by measuring the amount of assistance or look-ups the student required. If the student had required 5 look-ups, the film would have stopped on the preceding slide and if the student had zero look-ups, the film would have advanced to the next master with no review.

Figure 8:
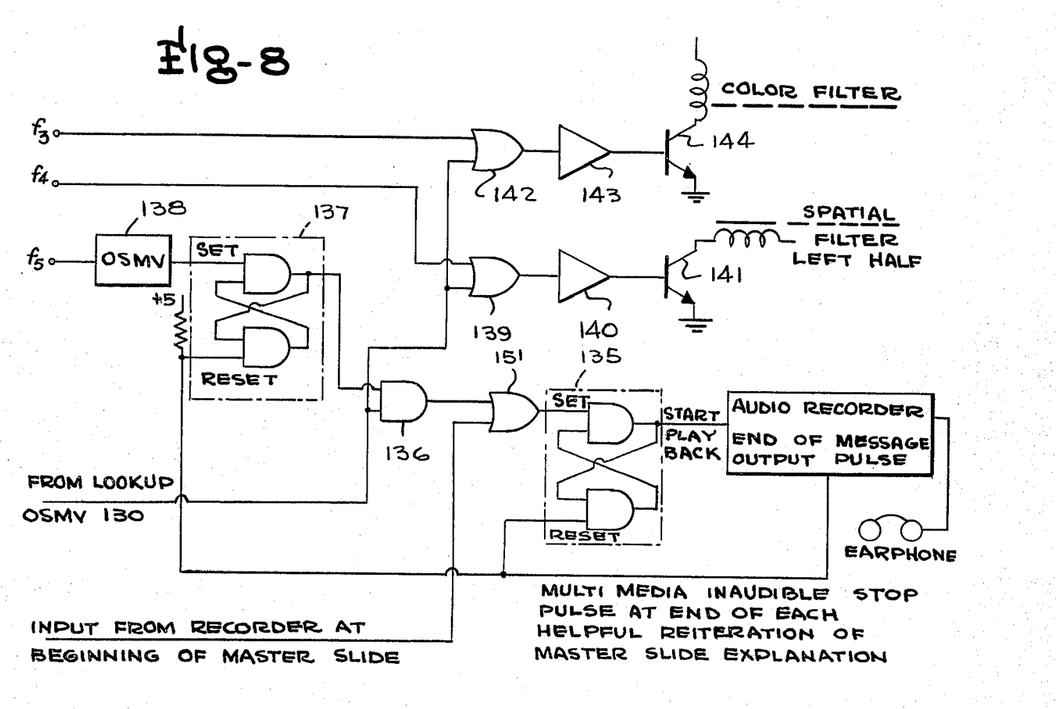

The audio tape recorder is provided to give the student a verbal message of explanation along with each master and each supplementary slide. In most cases, the student will commence work while the tape recorder plays which is an acceptable procedure. The circuit connections controlling the recorder are shown in FIG. 7 and FIG. 8. The recorder is the same unit in both figures, however, the "Fast Forward" and "Play" inputs and the "Multimedia" and "stop pulse" outputs are shown respectively in FIGS. 7 and 8 for clarity. A commercially available recorder with these features is well known and its internal operation will not be discussed.

To allow the recorder to rapidly advance to a Master Slide when a new subject is to be presented, the circuit of FIG. 7 is used. As detaled before, the Master frame code dot is sensed by the photocells 82 of FIG. 2 and FIG. 3 and circuitry of FIG. 9 to drive the OSMV 121 of FIG. 7. This sets the flip flop 122 and its output passes through amplifier 123 to drive transistor 124 to close relay RE1 and switch the tape recorder to the fast forward mode. The fast forward continues, running through unused messages, until the output of the inaudible pulse signifies the beginning of the master message. This otuput resets flip flop 122 and allows the relay to open and switch the recorder to normal playing speed.

When the audio message for the master slide is complete, a multimedia output is detected by the tape machine. This is illustrated in FIG. 8. This output from the recorder resets the flip flop 135 which output stops the recorder. The recorder can be restarted by a set input to the flip flop from OR gate 151.

The OR gate 136 can be triggered either by an output from the film dots on the master slide as explained above, or by an output from flip flop 137. A film dot indication from f5 triggers the OSMV 138 as the film comes into position in the projector. This set condition remains until both the look-up button 34 has been pressed, causing the recorder to start and the recorder finishes its message and detects a multimedia pulse which resets flip flop 137 at the same time it also resets flip flop 135. This arrangement allows only the first look-up to carry an audio message after a new frame is presented which speeds the teaching process because the audio material is the slowest and most quickly forgotten communication to the student.

Also shown in FIG. 8 is the circuitry for operating the color filter assembly 37 and spatial filter assembly 38. Code dot 4 is used to control the spatial filter assembly 37. When this filter is used it normally covers one half of the image material until a look-up is required. At that time it is pulled back to expose the entire image. There are other frames where the spatial filter is not used at all as in the case where the color filter is used.

The code dot f4 is used to provide for these possibilities. If segment f4 is black, the output to the OR gate 139 is negative and the look-up OSMV 130 on FIG. 7 is normally negative, and the output of the OR gate 139 is zero. A zero output from OR gate 139, when passed through amplifier 140 to solenoid driver transistor 141, causes the solenoid to be deactivated and leaves the spatial filter covering half the image. If the look-up button 34 is pressed, OSMV 130 sends an output to OR gate 139 which drives amplifier 140 and transistor 41 to activate the solenoid and retract the spatial filter and allow the student to see the left half of the image for the duration of the period of OSMV 130. (About 2 seconds.)

If the code dot f4 is transparent, the output to OR gate 139 is positive and the solenoid is activated, whether look-up button 34 is activated or not and the left side of the image is exposed continuously which would normally occur when the learning material calls for color filter only.

The color filter operates in a similar manner to the spatial filter. A transparent code dot f3 feeds OR gate 142 to remove the color filter when current does not flow in the solenoid. If code dot f3 is black the output of OR gate 142 causes current to flow in the solenoid and pulls the color filter over the entire image. If at that time the look-up button is pressed, the output or OR gate 142 causes the current in the solenoid to cease and the filter is removed for the duration of the look-up OSMV 130.

Following is an example of the versatility and intensive means of teaching a variety of subjects provided by the present invention wherein the student is subjected to visual, audible and time-limited stimulus and is required to interact with the best motor skills and mental guidance:

The time line shown in FIG. 10 describes a typical student using the audio visual device of the present invention in a typical subject. Since the potential activities of each student will vary and the program material for the subjects can be very diversified, the following narrative description illustrates the concept of the interactions between the student and the audio visual device, the results obtained and the corresponding technical operation of the audio visual device.

The student is learning the subject of shorthand and this is his second or third lesson; therefore, he is familiar with the equipment. The film package and tape reel have been supplied by the student's instructor, who will collect the papers generated by the student at the end of the session. The film tape and software package utilizes a sequence of micro subjects in which five frames of film are devoted to each detail of the micro subject. The student turns on the power, focuses the projector and places a pad of white paper on the work surface.

The student presses the advance button 36 as shown at time instant T1 in FIG. 10, which advances the first master slide into the projector. The master slide is then projected onto the paper pad where the image covering the left half of the paper pad is a column of sample longhand vowels which the student instantly recognizes, and alongside the vowels are the shorthand equivalent symbols which are probably unknown to the student.

When the student pressed the advance button the first time the electronic package advanced the film to the first master slide. This particular master slide has code dots causing the spatial filter to blank out the righthand side of the master slide image leaving the lefthand portion visible to the student and containing the image described above. When the student presses the advance button, the tape recorder 30 begins to briefly explain the column of sample longhand vowels and equivalent shorthand symbols. The voice on the tape also instructs the student to read a longhand symbol out loud to himself and to trace over the shorthand equivalent shown. After completing this tracing he is instructed to continue forming the shorthand symbols repeatedly on the blank righthand portion of the paper being careful to maintain the proper shape and size of the shorthand symbol being repeated.

The student, who is fairly dexterous with his pencil, begins tracing and duplicating the symbols. He is satisfied with the appearance he achieves, and after completing the assignment on the first master slide presses the advance button, as shown at T2 in FIG. 10. The film then advances through four frames and stops on the fifth, the next master frame, while the tape recorder also advances through four short messages and stops on the fifth or master message. Since the student did not need any assistance to complete his first master assignment, he did not press the look-up button 34. The audio message then instructs the student to tear off the top sheet of paper and lay it aside for the instructor to collect later.

The visual image is once again projected on only the left side of the paper, and shows a short column of two and three-word longhand phrases which use the shorthand symbols from the previous lessons. The tape recorder audibly instructs the student to write the equivalent shorthand symbols on the right side of the paper opposite their longhand equivalents which are projected on the lefthand portion of the paper. The student commences writing and has no difficulty until he attempts the last few longhand phrases. Being uncertain of the shorthand equivalents of the longhand phrases the student presses the look-up button as shown at T3 in FIG. 10 to receive additional teaching assisstance. The spatial filter moves out of the projected image for two seconds and reveals the righthand side of the image containing the correct translations, which permits the student to clarify the proper shorthand translation. The student completes the list without further difficulty, and presses the advance button, as shown at T4 in FIG. 10.

The electronic control package 32 has recorded the single pressing of the look-up button, which indicates the student has had difficulty with the lift of longhand phrases to be translated into shorthand symbols; therefore, the look-up counters in the control package allow the film to advance only two frames, stopping on the third frame, a review frame of the micro assignment. The tape recorder, which is synchronized with the frames, then audibly instructs the student to tear off the top sheet and place it aside for the instructor to collect. The third frame presents the student with a visual image of a group of phrases which he can convert to shorthand and having just looked up the only items for which he was uncertain the student completes the list without requiring for any additional look-ups. He presses the advance button and, since there were no look-ups on the frame just completed, the film is advanced to the next master frame, thereby skipping over the fourth slide of the completed micro assignment as shown at T5 in FIG. 10.

This master frame is of a different format and includes visually the entire page of the paper pad; however, it is of a red color on a dark background. This particular micro assignment is longhand sentences with considerable space between the lines to allow the student to write in shorthand between the lines. The audio message instructs the student to complete this assigmnent on a fresh sheet of paper. He commences very well on this assignment; however, he soon finds a couplet which he is unable to convert, which causes him to press the look-up button, as shown at T6 in FIG. 10. The red filter is removed from the projector beam, leaving the red longhand but causing a blue shorthand of the proper convention to appear in the space between the longhand sentences to guide the student in the proper form of conversion of the longhand phrases. The blue image remains for only two seconds; however, the student quickly solves the conversion and continues on. Before he completes the entire image conversion, he presses the look-up button as shown at T7 and T7 in FIG. 10 before he is able to complete the entire conversion. He then presses the advance button, as shown at T9.

The look-up counters in the electronic control package 32 have received a total of three look-ups in the micro assignment which the student has just completed, causing the advanced circuitry to move ahead only to the next frame, which is a review with variations of the master frame just completed. The tape recording accompanying this frame is devoted to re-exploring the content and principles of this micro assignment to assist the student in grasping the contents of the lesson. The accompanying audio statements clarify the micro assignment, thereby permitting the student to complete the frame without requiring any additional look-ups. The student having received the additional clarification completes the conversion without further look-up and presses the advance button, as shown at T10. Since the student has not used any look-ups for this frame, the projector is advanced through the next three frames to the following master frame. These steps are continued with the lesson material, audio, spatial shutters and color filters being controlled according to the software format and the student's performance.

After about fifty minutes the instructor returns, stops the student as he begins a new master frame, collects his papers, which become the written record of his progress, and notes the location at which the student will start on his next session.

The first student leaves the area and a second student appears to study biology, where he is in the midst of the study of frogs. Instructor brings in the biology film and tape package and sets up the frame where the second student left off in his previous session. The second student presses the advance button and is given the audio and a full color half-page image of a frog anatomy. Certain arrows point to parts of the frog image and the corresponding labels are in the blanked-out section of the page. In his previous lessons, the second student has learned the names that match the arrows pointing to the various parts of the frog. He labels each part with his pencil and traces the outline of the organs. Since he does not require any look-ups before he finishes the labeling, he advances the projector to the next master frame. This frame provides only a red outline, since color filtering has been actuated by the electronic control package 32. The tape recording verbally refers to the names of the organs, and the second student is required to draw the organs inside the outline. He becomes confused, and presses the look-up button for additional assistance, wherein the control package retracts the red filter, thereby causing the organs to be shown in blue for two seconds, which clarifies the details for him and permits him to continue. Having pressed the look-up button once, the projector is advanced to the fourth frame when the second student presses the advance button rather than the master, and presents a review of the subject matter which confused him. The additional sequencing is as described above.

Numerous modifications of the subject invention will undoubtedly occur to those skilled in the art; for example, the work table 25 could be formed of a transparent material such as glass or plastic with the projector 24 and mirror positioned to project the image upwardly through the work table 25 and against a piece of paper laying on the work table. In this way, the student will not interfere with the projected image as he works on the work table. It should therefore be understood that the spirit and scope of the invention is to be limited solely in light of the appended claims.

I claim:

1. An audio-visual device which is capable of responding to a student's capability to learn or to absorb a variety of subjects and mode of skills, said audio-visual device comprising a surface mean for displaying a projected visual image on which the student can write, a visual image projecting means for projecting a series of visual images onto the surface means, an audio means for creating an audible signal synchronized with the visual images, a manual advance means for advancing the visual images a predetermined number of visual images, a manual look-up means for causing additional information to be projected in a particular visual image if the student manually operates the look-up means in completing a lesson taught in said particular visual image, and a control means for advancing the visual images less than said predetermined number of visual images and in relationship to the frequency of manual operation of the look-up button.

2. An audio-visual device according to claim 1 wherein the surface means includes a table on which the student may work and a sheet of paper positioned on the table.

3. The audio-visual device of claim 1 wherein the visual image projecting means comprises a film projector.

4. The audio-visual device of claim 1 wherein the audio means comprises a magnetic tape recorder having a magnetic tape upon which a verbal lecture associated with each visual image may be recorded.

5. The audio-visual device of claim 1 wherein the manual advance means comprises a push-button located adjacent the surface means and operable by the student to advance the visual images a predetermined number of visual images.

6. The audio-visual device of claim 1 wherein the look-up means comprises a look-up switch adjacent the surface means for operation by the student and a color filter means operable by the look-up switch and normally positioned in the beam from the visual image projector means to filter a portion of the visual image from the beam, wherein activation of the look-up switch causes the filter to be retracted from the beam to permit the projection of the previously filtered portion of the visual image onto the surface means.

7. The audio-visual device of claim 1 wherein the look-up means includes a look-up switch located adjacent the surface means and a spaced shutter means positioned to block portions of the beam from the visual image projector and retractable by the switch.

8. An audio-visual device which is capable of responding to a student's capability to learn or to absorb a variety of subjects and skills, said audio visual device comprising a table on which the student may work and a sheet of paper positioned on the table, a film projector for projecting a series of visual images onto the paper, a magnetic tape recorder having a magnetic tape upon which a verbal lecture associated with each visual image may be recorded for creating an audible lecture which may be synchronized with the visual images, a manual advance means for advancing the film in the projector a predetermined number of visual images, a look-up switch adjacent the table for operation by the student and a color filter means operable by the lookup switch and normally positioned in the beam from the film projector to filter a portion of the visual image from the beam, wherein activation of the look-up switch causes the filter to be retracted from the beam to permit the projection of the previously filtered portion of the visual image onto the paper, and a control means for synchronizing the visual images with the verbal lecture on the magnetic tape and for advancing the visual images less than said predetermined number of visual images and in relationship to the frequency of manual operation of the look-up switch.

9. The audio-visual device of claim 8 wherein the color filter means comprises pivot supports mounted on the table adjacent the projected beam from the film projector, a color filter pivoted on the pivot supports and rotatable into the projected beam, a biasing spring mounted between the table and the filter to bias the spring into the beam to filter a portion of the visual image from the beam, a rotary solenoid connected to the color filter and mounted on the table to rotate the filter out of the beam when the solenoid is activated by the look-up switch.

10. The audio-visual device of claim 8 additionally including an earphone jack mounted adjacent the table and connected to the magnetic tape recorder to receive earphones worn by the student thereby permitting the use of numerous audio visual devices in a closed area without interfering with the individual operation thereof.

11. The audio-visual device of claim 8 additionally including a space shutter means for blocking portions of the beam from the film projector, said space shutter means is retractable by the look-up switch.

12. The audio-visual device of claim 8 wherein the manual advance means is an advance switch mounted adjacent the table and is connected to the control means for causing the advance of the visual images.

13. The audio-visual device of claim 1 wherein the space shutter means includes a spring retractable roller mounted on the table adjacent the visual beam, an opaque curtain mounted on the roller to block at least a portion of the beam from the film projector, guide means attached to the table for directing the curtain into a position within the beam, a solenoid means connected to the curtain and actuated by the look-up switch for moving the curtain into a position within the beam.

14. An audio-visual device for teaching students a variety of subjects and motor skills said device including a housing having a study work table, a film projector mounted horizontally in the housing below the work table, a lower and an upper mirror mounted in the housing to direct the beam projected by the film projector through an opening in the housing and onto the work table, a magnetic tape recorder mounted in the housing for creating a verbal lecture, a plurality of photocells mounted in a portion of the projected beam to detect coded light and dark areas on the film, a look-up switch mounted adjacent the work table, an advance switch mounted adjacent the work table, a spaced shutter means positioned in the housing to block portions of the beam from the film projector, a color filter means positioned in the beam from the film projector to filter a portion of the visual image from the beam, and an electronic control means for advancing the film a predetermined number of visual images when the advance switch is actuated in relationship to the frequency of manual operations of the look-up switch, for retracting the color filter or the spaced shutter means as determined by the coded light and dark areas on the film when the look-up switch is actuated to provide additional information to the student, and for synchronizing the verbal lecture on the magnetic tape recorder with the visual images on the film.

15. The audio-visual device of claim 14 wherein the color filter includes a rotary solenoid mounted in the housing, a color filter pivotably mounted on the housing adjacent the projected beam, a biasing means between the filter and the housing for biaing the filter into the projected beam, a retract cable connecting the filter to the rotary solenoid whereby activation of the solenoid retracts the filter out of the projected beam when the solenoid is activated by the electronic control means.

16. The audio-visual device of claim 15 wherein the spaced shutter means includes a spring retractable roller, an opaque flexible curtain wound on the roller, a rotary solenoid mounted on the housing, and a cable connecting the opaque curtain and the rotary solenoid whereby actuation of the rotary solenoid by the electronic control means causes the opaque curtain to extend across a portion of the projected beam.

17. The audio-visual device of claim 16 wherein the housing comprises a support pedestal positionable on the floor, a closed box mounted on top of the support pedestal, said closed box having a rearwardly sloping front wall, a vertical rear wall, and vertical side walls, said work surface including a front cover forming a portion of the top of the closed box, and a projector hood covering the rear portion of the top of the box, said projector hood including side walls and top walls to form a passageway for the projected beam which is reflected by the lower end and upper mirrors from the projector mounted in the closed box back to the work surface.

18. The audio-visual device of clain 17 wherein the closed box includes partitions dividing the box into compartments for receiving and retaining the film projector, the magnetic tape recorder, and the electronic control means.

19. The audio-visual device of claim 18 additionally including an earphone jack mounted in a front wall of the projector hood and connected to the magnetic tape recorder to receive earphones worn by the student thereby permitting the use of numerous audio-visual devices in a closed area without interfering with the individual operation thereof.

20. The audio-visual device of claim 14 wherein the electronic control means includes a look-up one shot multivibrator having an input connected to the look-up switch, a binary counter having an input connected to the output of the look-up one shot multivibrator, a dot pattern decoder having inputs connected to the outputs from the photocells, a four bit comparator having an input connected to the output from the binary counter and the output from the dot pattern decoder, an advance one shot multivibrator having an input connected to the advance switch, an advance logic means having inputs connected to the outputs from the advance one shot multivibrator and from the four bit comparator for advancing the projecting means based on signals received from the advance one shot multivibrator and the four bit comparator, a spatial filter AND gate having inputs connected to the outputs from the look-up one shot multivibrator and from the dot pattern decoder, a spatial filter solenoid having an input connected to the spatial filter AND gate to retract the spaced shutter means out of the beam from the projector, a color filter AND gate having inputs connected to the outputs from the look-up shot multivibrator and from the dot pattern decoder, a color filter solenoid having an input connected to the color filter AND gate to retract the color filter means out of the beam from the film projector, and an audio AND gate having inputs connected to the outputs from the look-up one shot multivibrator and from the dot pattern decoder to provide an output which is connected to an input to the tape recorder to activate the tape recorder.

* * * * *